United States Patent

[11] 3,623,747

| [72] | Inventor | Robert F. Humlong |
| | | Maysville, Ky. |
| [21] | Appl. No. | 875,432 |
| [22] | Filed | Nov. 10, 1969 |
| [45] | Patented | Nov. 30, 1971 |
| [73] | Assignee | Wald Manufacturing Company, Incorporated |
| | | Maysville, Ky. |

[54] AXLE BRACKET FOR SADDLE BASKET
7 Claims, 4 Drawing Figs.

[52] U.S. Cl. ................................................. 280/202,
224/32 A, 248/230, 280/289
[51] Int. Cl. ....................................................... B62j 9/00
[50] Field of Search ............................................. 280/202,
289; 224/30, 32, 32 A; 248/230; 24/81 CC

[56] References Cited
UNITED STATES PATENTS
| 2,455,683 | 12/1948 | King ............................... | 24/81 CC |
| 2,631,076 | 3/1953 | Redlich ........................... | 248/229 X |
| 2,750,990 | 6/1956 | Eves .............................. | 24/81 CC X |
| 3,414,223 | 12/1968 | Pawsat .......................... | 248/230 |
| 3,396,885 | 8/1968 | Giondi............................ | 224/32 |
| 3,486,531 | 12/1969 | Nalodka ........................ | 24/81 CC X |

FOREIGN PATENTS
| 1,122,022 | 7/1968 | Great Britain................ | 24/81 CC |

*Primary Examiner*—Leo Friaglia
*Assistant Examiner*—John P. Silverstrim
*Attorney*—J. Warren Kinney, Jr.

ABSTRACT: The saddle basket mounting means includes an axle-supported rigid bracket on which a clamp plate member is mounted, said clamp plate member being grooved and designed to impose two different forms of clamping action upon the bottom wires of the basket, thereby ensuring a tight, motionless, noiseless mount for the basket.

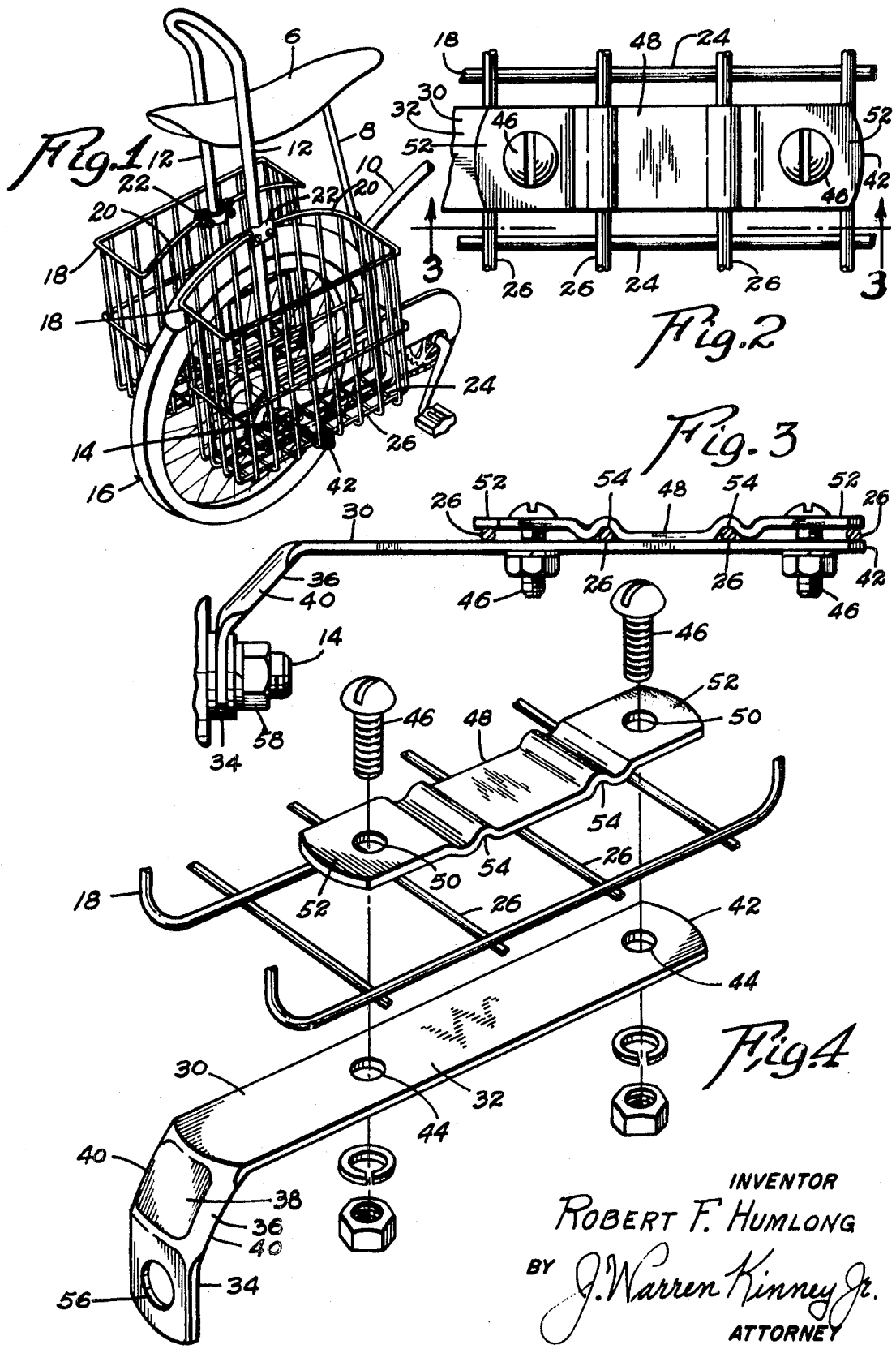

AXLE BRACKET FOR SADDLE BASKET

This invention relates to an axle bracket for a saddle basket applied to bicycles, and constitutes an improvement upon the attachment disclosed in the Ruben L. Pawsat U.S. Pat. No. 3,414,223, dated Dec. 3, 1968.

The invention pertains particularly to the mounting of twin baskets upon bicycles provided with polo seats, or banana seats, which generally overlie the rear wheel and are braced from the rear wheel axle of the bicycle. The attaching means comprises a bracket disposed under the base of the basket, and a clamp carried by an upper rim portion of the basket. The bracket and the clamp both include means for securement to the basket and to the wheel axle.

An object of the invention is to provide an improved basket attachment means whereby a basket, or preferably a pair of twin baskets, may be mounted alongside the rear wheel of a bicycle of the type mentioned above.

Another object of the invention is to provide an improved means of attachment for baskets upon a bicycle of the character stated, which is simple, durable and inexpensive, and which is quickly and easily installed upon a bicycle with the use of ordinary tools.

A further object is to provide improved clamp means for mounting a basket or baskets upon a bicycle as stated, the clamp means being very tenacious as to its holding power, yet extremely versatile in its application, and capable of securing baskets of different sizes and shapes upon the axle and the seat braces of a bicycle of the type mentioned.

The foregoing and other objects are attained by the means described herein and illustrated upon the accompanying drawing, in which:

FIG. 1 is a fragmentary perspective view showing twin baskets mounted upon a bicycle, utilizing the improved axle bracket of the present invention.

FIG. 2 is a fragmentary top plan view of the axle bracket applied to the wire bottom of a basket.

FIG. 3 is a cross section taken on line 3—3 of FIG. 2, showing the bracket in its entirety, and secured to a wheel axle by means of a nut.

FIG. 4 is an exploded perspective view of the FIG. 3 structure.

In the drawing, FIG. 1 illustrates the rear end portions of a bicycle of the type which includes a polo seat, or banana seat 6, mounted upon a seat post 8 of frame 10, the seat being attached to and stabilized by a pair of spaced substantially parallel seat braces 12, 12. The lower ends of the seat braces may be suitably secured to the bicycle frame at the rear wheel axle 14. The braces 12, 12 straddle the frame and the rear wheel 16, and provide rigid support for the twin saddle baskets 18, 18 which are located astride the wheel. The upper rims 20, 20 of the saddle baskets have clamp connections 22, 22, with the seat braces 12, 12, preferably as disclosed by the Pawsat patent aforesaid.

Since the saddle baskets are identical to one another, and the means for mounting them upon the bicycle are identical, a description of one basket and its mounting means will suffice for the other also.

The basket bottom comprises an open arrangement of stiff wires 24 and 26 crossing one other, the wires preferably being welded together at their points of contact to provide a rigid structure. The wires 26 of the basket bottom are uniformly spaced apart, by preference, and the wires 24 likewise may be spaced apart uniformly if desired. The mean plane of the basket bottom may be located close to the axis of the rear axle 14, and as herein shown, the basket bottom is horizontal and elevated slightly above the level of axle 14.

Support for the basket bottom is provided by a rigid bracket 30 secured to one end of the rear wheel axle. The bracket may comprise an elongate arm member 32 having one base end portion 34 turned at substantially a right angle to the arm member in angular sections, as shown. That is, instead of having a rounded bend or a sharp bend at end portion 34, the bend consists of a reinforced connecting portion or strut 36 arranged at an angle of approximately 45° to the portions 32 and 34. The connecting portion 36 may be reinforced by stamping or forming therein a dimple 38 and turning the side edges at 40.

The opposite or free end 42 of arm member 32 may extend across substantially the full width of the basket. The arm member is provided with spaced apertures 44 for the reception of screws 46.

The reference numeral 48 denotes a clamp plate member having opposite end portions provided with apertures 50 spaced apart in correspondency with the spacing of apertures 44. The end portions 52, 52 of the clamp plate member may be slightly offset from the plane of the middle portion of said member, if desired (FIG. 3). Between said middle portion and the end portions 52, 52, the clamp plate member is provided with transverse parallel grooves or seats 54 receptive of the bottom wires 26. The grooves or seats are spaced apart in correspondency with the spacing of wires 26, and the depth of the grooves preferably is slightly less than the diameter of said wires.

In the light of the foregoing explanation, it will be understood by referring to FIG. 3, that tightening the screws 46 will advance the clamp plate member 48 forcefully onto all of the wires 26 spanned thereby. Noteworthy also is the fact that two different types of clamping actions are imposed upon the wires, as at 54 and at 52, so that there can be no failure of member 48 to effectively clamp the wires spanned thereby. The clamping action at grooves 54 will of course serve also to preclude displacement of the basket in a direction lengthwise of arm member 32.

In a possible reversed construction, the spaced grooves such as 54 may be provided in the arm member 32 rather than in the clamp plate member as shown. The clamp plate member and arm member 32 in any case may be formed of strap metal of suitable quality, and these parts may have any desired or appropriate width and thickness dimensions.

The aperture 56 in the base portion 34 of member 30 is dimensioned to accommodate the rear wheel axle 14, upon which it may be securely fixed by the axle nut 58 backed up by suitable washers as shown in FIG. 3.

The construction herein disclosed provides a simple and inexpensive means for facilitating the mounting of saddle baskets on a bicycle, so that the baskets may not shift or become loose and thereby possibly result in injury to the cyclist while riding. The bracket member 30 is formed to be extraordinarily rigid and strong, and its use ensures maximum durability of the structure and freedom from noise and vibration.

What is claimed is:

1. A basket structure for bicycles of the type having a polo seat including a rear seat portion supported upon a pair of spaced upright braces projecting upwardly from the rear wheel axle of the bicycle, said basket structure comprising in combination: a basket having an upper rim member, and side and bottom walls formed of a series of spaced wires some of which are parallel to one another; a rigid metallic bracket for supporting the basket bottom, said bracket comprising a base apertured to receive one end of the rear wheel axle, and an arm member extended from the base substantially at right angles thereto; said arm member being an elongated narrow strap having a flat face thereon, a clamp plate member having a central portion and end portions, the central portion being in a plane offset from the end portions, transverse grooves in the plate member on each side of the central portion adjacent the end portions, the grooves being spaced apart corresponding to the spacing of the parallel wires, the parallel wires resting in the grooves, means in the end portions for securing the clamp plate upon the arm with the central portion in contact with the arm and the end portions spaced from the arm and with the parallel wires within the grooves, and second means securing the upper rim to the braces.

2. The combination as defined by claim 1, wherein the offset spaces said end portions from said arm member a distance approximating the thickness of a wire of the basket bottom wall.

3. The combination as defined by claim 1, wherein said end portions reach outwardly beyond the middle portion of the clamp plate member a distance such as to overlie other bottom wall wires which are disposed outwardly of said grooves.

4. The combination as defined by claim 3, wherein the securing means for the clamp plate member includes apertures formed in said clamp plate end portions, and fasteners in said apertures adapted for securement to said arm member.

5. The combination as defined by claim 1, wherein the transverse grooves aforesaid are formed in the material of the clamp plate member.

6. The combination as defined by claim 3, wherein the transverse grooves aforesaid are formed in the material of the clamp plate member.

7. The combination as defined by claim 4, wherein the transverse grooves aforesaid are formed in the material of the clamp plate member.

* * * * *